United States Patent [19]
Fakes et al.

[11] Patent Number: 5,793,970
[45] Date of Patent: Aug. 11, 1998

[54] METHOD AND COMPUTER PROGRAM PRODUCT FOR CONVERTING MESSAGE IDENTIFICATION CODES USING A CONVERSION MAP ACCESIBLE VIA A DATA LINK

[75] Inventors: Thomas F. Fakes; Dinarte Morais; Max L. Benson, all of Redmond, Wash.

[73] Assignee: Microsoft Corporation, Redmond, Wash.

[21] Appl. No.: 680,214

[22] Filed: Jul. 11, 1996

[51] Int. Cl.$^6$ .................................................. G06F 15/167
[52] U.S. Cl. ............................... 395/200.46; 379/93.24; 707/1; 395/200.49
[58] Field of Search ..................... 711/202; 395/200.76, 395/616, 200.46, 200.49; 379/93.24; 707/1

[56] References Cited

U.S. PATENT DOCUMENTS

| | | | |
|---|---|---|---|
| 4,914,577 | 4/1990 | Stewart et al. | 711/207 |
| 5,029,074 | 7/1991 | Maskas et al. | 395/309 |
| 5,202,983 | 4/1993 | Orita et al. | 707/4 |
| 5,218,699 | 6/1993 | Brandle et al. | 395/684 |
| 5,247,676 | 9/1993 | Ozur et al. | 395/684 |
| 5,283,856 | 2/1994 | Gross et al. | 395/51 |
| 5,307,494 | 4/1994 | Yasumatsu et al. | 707/200 |
| 5,434,914 | 7/1995 | Fraser | 379/219 |
| 5,537,543 | 7/1996 | Itoh et al. | 395/185.01 |
| 5,627,996 | 5/1997 | Bauer | 395/500 |
| 5,701,462 | 12/1997 | Whitney et al. | |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary "cc:Mail View Keeps an Eye on Your Messaging System", Network Computing, Jun. 1, 1995, CMP Publications, Inc. 1995.

*Primary Examiner*—Kenneth S. Kim
*Attorney, Agent, or Firm*—Workman, Nydegger & Seeley

[57] ABSTRACT

In an electronic mail system comprising a local computer that can be connected to a message server over a data link, mechanisms are provided to convert large identification codes used by the message server to store and access messages and folders into shorter identification codes used by the local computer to access locally stored copies of the messages or folders. The large server identification codes, including a 46-byte folder codes and 70-byte message codes, are converted using a conversion technique that operates in one of two modes, depending on whether the data link to a master conversion map on the message server is available and operative. In the first mode, to convert the codes to 8-byte codes, the technique uses a local cache that retains mapping information produced in conversions using the master conversion map. In the second mode, three types of local maps are implemented as B-trees are used to convert the codes first to the 8-byte codes and then to 4-byte codes. In a reverse conversion using one of the B-tree maps, a 4-byte code is converted back to a 46 or 70-byte code.

34 Claims, 8 Drawing Sheets

METHOD AND COMPUTER PROGRAM PRODUCT FOR CONVERTING MESSAGE IDENTIFICATION CODES USING A CONVERSION MAP ACCESIBLE VIA A DATA LINK

BACKGROUND OF THE INVENTION

The invention is directed to messaging systems.

In a messaging system, messages directed to a user are typically stored in a mailbox that is stored on a messaging server computer, e.g., a server in a client-server or shared-file computer system. The user gains access to the mailbox across a data link such as a network connection or a dialup modem connection. Often, the messages in the mailbox are organized into groups such that each group corresponds to a mailbox folder.

Usually, the user manipulates the mailbox directly, using a local computer having messaging software that is directed to open the mailbox's folders and messages via the data link. The messaging software opens the folders and messages to allow the user to read the messages, generate replies, and otherwise manipulate the messages. To do so, the messaging software uses identification codes that identify each folder and message. Each time the messaging software opens a message or a folder, the messaging software sends at least one of the identification codes across the data link. Thus, for example, if the messaging software is directed to open twenty messages, the messaging software sends at least twenty identification codes across the data link.

The data link may be expected, from time to time, to become temporarily unavailable or inoperable. Thus, the user has occasions to expect that access to the mailbox will become temporarily difficult or impossible. For example, the user may expect to take the local computer to a remote location, e.g., an airplane. Or the user may expect the local computer to be cut off from the server computer due to, e.g., a network disruption. On such an occasion, before access is so affected, the user directs the messaging system to update an off-line store on the local computer. The off-line store is updated by replicating at the off-line store, i.e., downloading across the data link to the local computer, a selection of folders, messages, or both from the user's mailbox in the server computer. Then the user works with the off-line store instead of the mailbox. Generally, the user prefers to be able to manipulate the folders and messages of the off-line store in the same way that the user manipulates the folders and messages of the mailbox.

SUMMARY OF THE INVENTION

The invention is directed to a technique for converting message and folder identification codes in a messaging system. When local messaging software has access to a messaging server, a message or folder code is converted to a server directory format by using a local computer conversion cache. The cache accumulates, during communications between the software and a messaging server, a subset of the contents of a master format conversion map stored at the server. When the local messaging software is without access to the messaging server, a first map implemented as a data structure known as a "B-tree" and located at the local computer is used in the conversion of a folder's code to the server directory format. A second B-tree map is then used to convert the server directory format to a local computer format. Furthermore, these two maps and a third map implemented as a third B-tree are used in the conversion of a message's code to the local computer format. In an embodiment relating specifically to converting from a Microsoft® Exchange Server entry identification ("EID") format to a server directory identification ("SDID") format, the technique is able to convert, e.g., a 46-byte folder EID code to an 8-byte folder SDID code. In addition, with respect to converting from EID format first to SDID format and then to a node identification ("NID") format, the technique is able to convert, e.g., a 46-byte folder EID code to a 4-byte folder NID code. Furthermore, in a reverse conversion using one of the B-tree maps, an NID code is converted to an EID code.

The invention provides several advantages. Long identification codes are reduced in size to minimize the amount of transmission and data storage resources used to identify messages and folders. A conversion cache is provided that automatically improves its ability to convert the codes. The ability is improved by retaining mapping information from previous instances of conversions.

In addition, messages stored using a local computer format can be manipulated by local message software that is configured to manipulate messages using a different format. The messages can be so manipulated because, according to the invention, each message's code is converted to the local computer format. Furthermore, messages and folders are stored in a space-efficient manner using the local computer format. For example, a 4-byte folder NID code is more than eleven times smaller than a 46-byte folder EID code. Moreover, the speed of the conversion to the local format is enhanced by the use of B-trees and caching. Conversion of a folder code requires at most only two B-tree map consultations and conversion of a message code requires at most only four B-tree map consultations.

In one aspect, the invention features a method of converting a first message identifier to a second message identifier, the first message identifier including a first part and a second part, the method including using a conversion map to produce an index from the first part, the index being smaller than the first part, and combining the index with the second part to produce the second identifier.

Implementations of this aspect of the invention may include one or more of the following features.

The method may further include using a second conversion map to produce a third message identifier from the second identifier. The third message identifier may be associated with a message store located at a local computer or a server. The first message identifier may be associated with another message store located at a server.

The method may further include using the first conversion map to convert a folder identifier or storing the second message identifier so that the first message identifier can subsequently be derived from the second message identifier in a reverse conversion using the first conversion map.

At least one of the maps may include a B-tree or may be associated with a cache.

The conversion map may include a subset of the contents of a master conversion map, the master conversion map may include a full set of mapping information for producing the index from the first part, and the master conversion map may be stored across a data link. The method may further include accumulating the subset by retaining mapping information obtained during a previous instance of a conversion, using the master conversion map if the index cannot be produced initially using the conversion map, starting with an empty conversion map when messaging software is started, or using the conversion map to convert a folder identifier.

A message at a message store across the data link may be stored using the second message identifier.

The method may further include determining whether to use a data link in the conversion and, depending on the outcome of the determination, selecting a local map or a map across the data link to serve as the conversion map. The method may further include using a second conversion map to produce a third message identifier from the second message identifier.

The conversion map may be associated with a cache, an off-line store, or a message store located across the data link, and may be used to convert a folder identifier.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
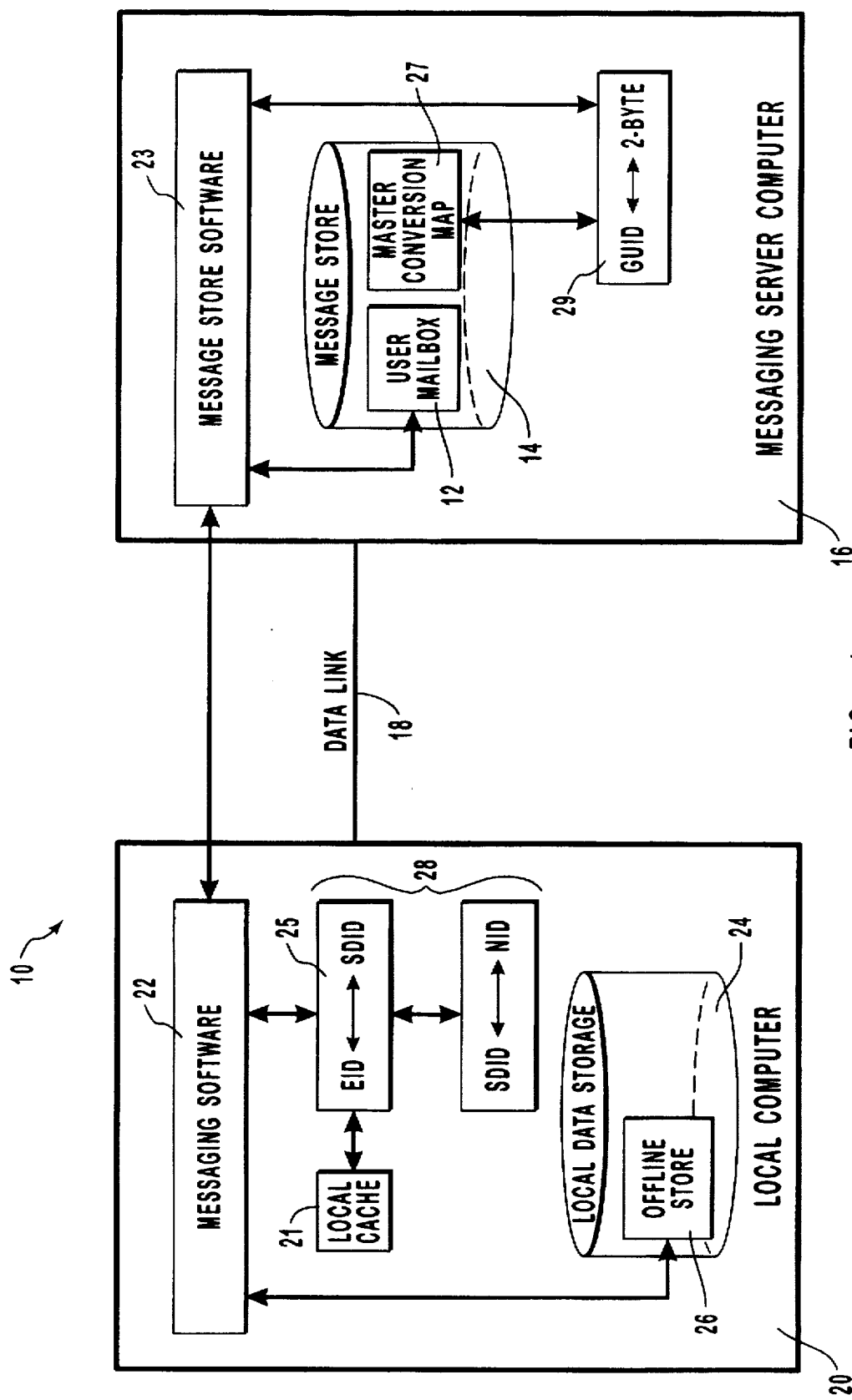
FIG. 1 is a block diagram of a messaging server computer and a messaging local computer.

FIG. 1 illustrates a messaging system 10 in which a user's mailbox 12 is stored in a message store 14 on a messaging server computer 16. Messages directed to the user are stored in the mailbox. A data link 18, preferably a network connection, connects the server 16 to a local computer 20 running messaging software 22. The messaging software initiates the opening of a message or folder by sending a message or folder identification code, described in detail below, to message store software 23 that runs on the server. The store software then opens the message or folder that corresponds to the identification code and provides the messaging software with access to the contents of the message or folder. Thus, while the data link is available and operative, the user manipulates the messages and folders of the user's mailbox by sending identification codes across the data link to the store software.

When the user expects access to the mailbox via the data link 18 to become difficult or impossible, the user directs the system 10 to update, on a local data storage medium 24, an off-line store 26. The off-line store 26 contains folders and messages downloaded across the data link 18 from the mailbox 12. With the software 22, the user is then able to read the messages and otherwise manipulate the folders and messages without relying on the data link. For example, the user can make changes to the folders and generate replies to the messages, which become effective in the system at a later time when the user directs the system to synchronize the off-line store and the mailbox.

In a preferred embodiment, the server 16 is a Microsoft® Exchange messaging server that conforms to a Messaging Application Programming Interface ("MAPI") standard. In conformity with the MAPI standard, the system 10 uses an entry identification ("EID") format that associates each message with a unique message entry identification code ("MEID") and each folder with a unique folder entry identification code ("FEID"). Preferably, the software 22 is then a Microsoft® Exchange messaging client program that is able to use the MEIDs and FEIDs to gain access to the messages and folders in the mailbox 12. This access is gained by converting the MEIDs and FEIDs to preferred shorter server directory identification codes ("SDIDs"). The store software uses the SDIDs to store the messages and folders in the mailbox. When the messaging software has an MEID or an FEID, the messaging software uses a local EID-SDID conversion process 25 to determine the corresponding SDID.

Figure 2:
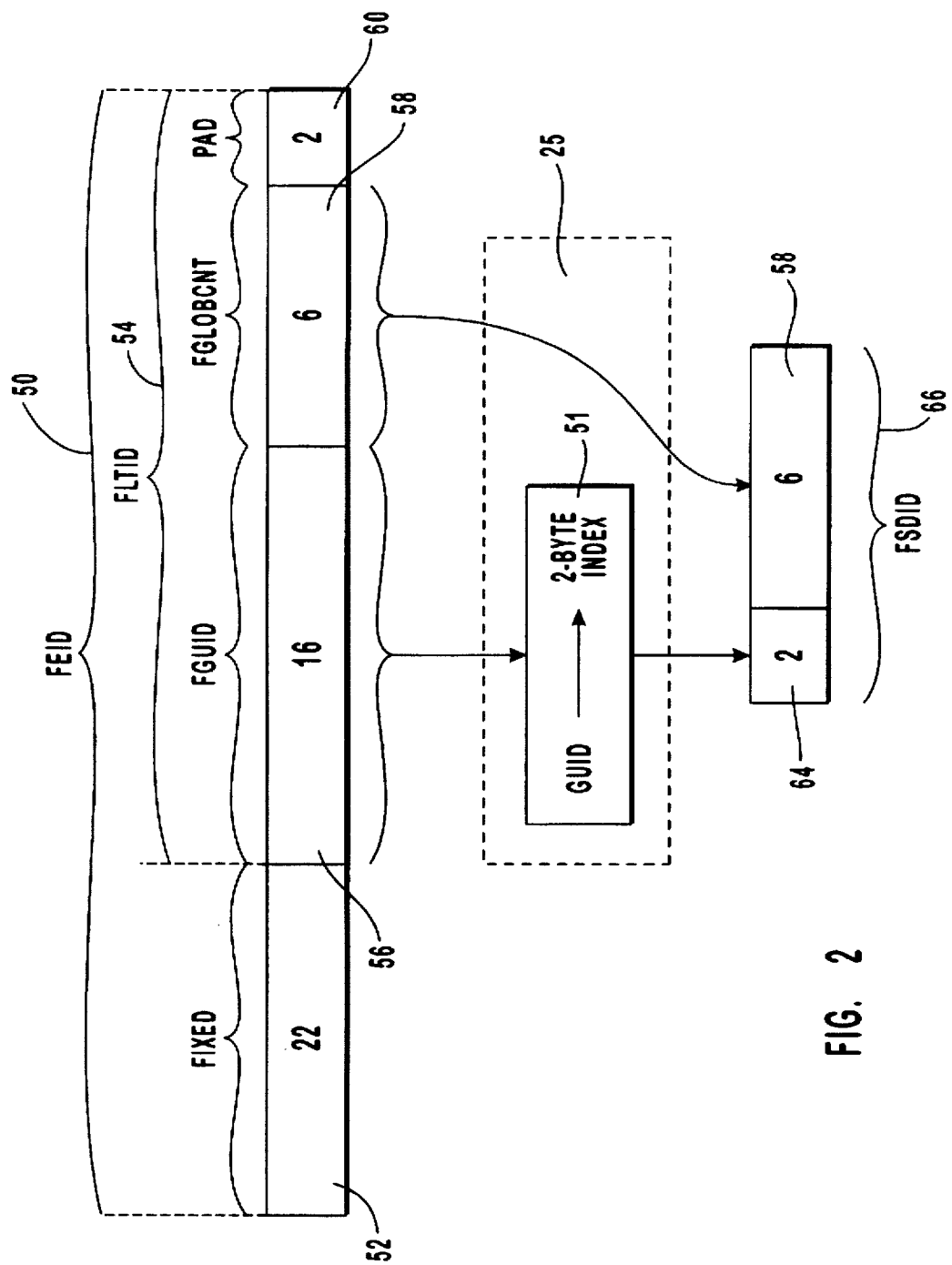
FIG. 2 is a block diagram of format conversions of a folder identification code to shorter server directory identification codes.
Figure 3:
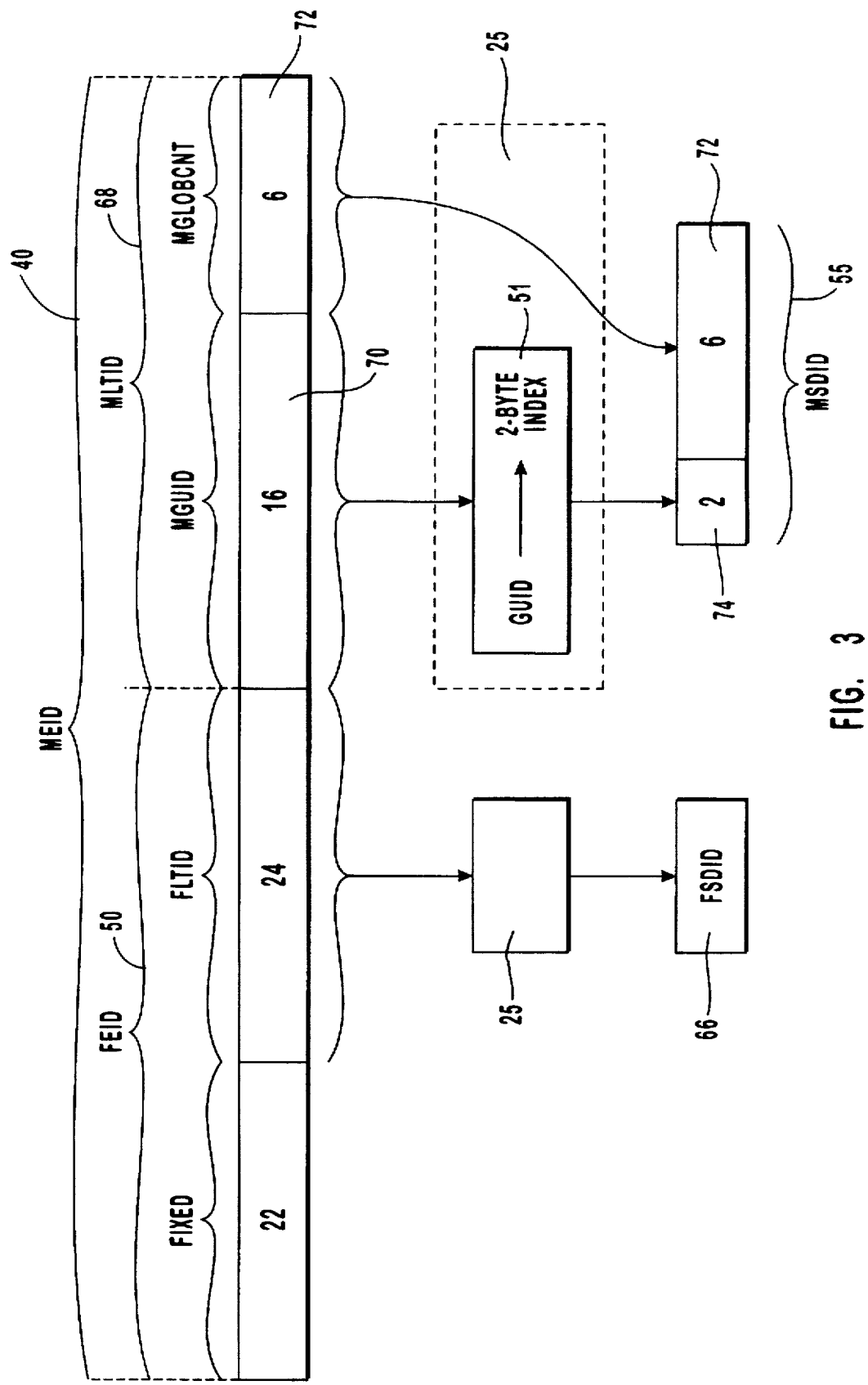
FIG. 3 is a block diagram of format conversions of a message identification code to shorter server directory identification codes.
Figure 4:
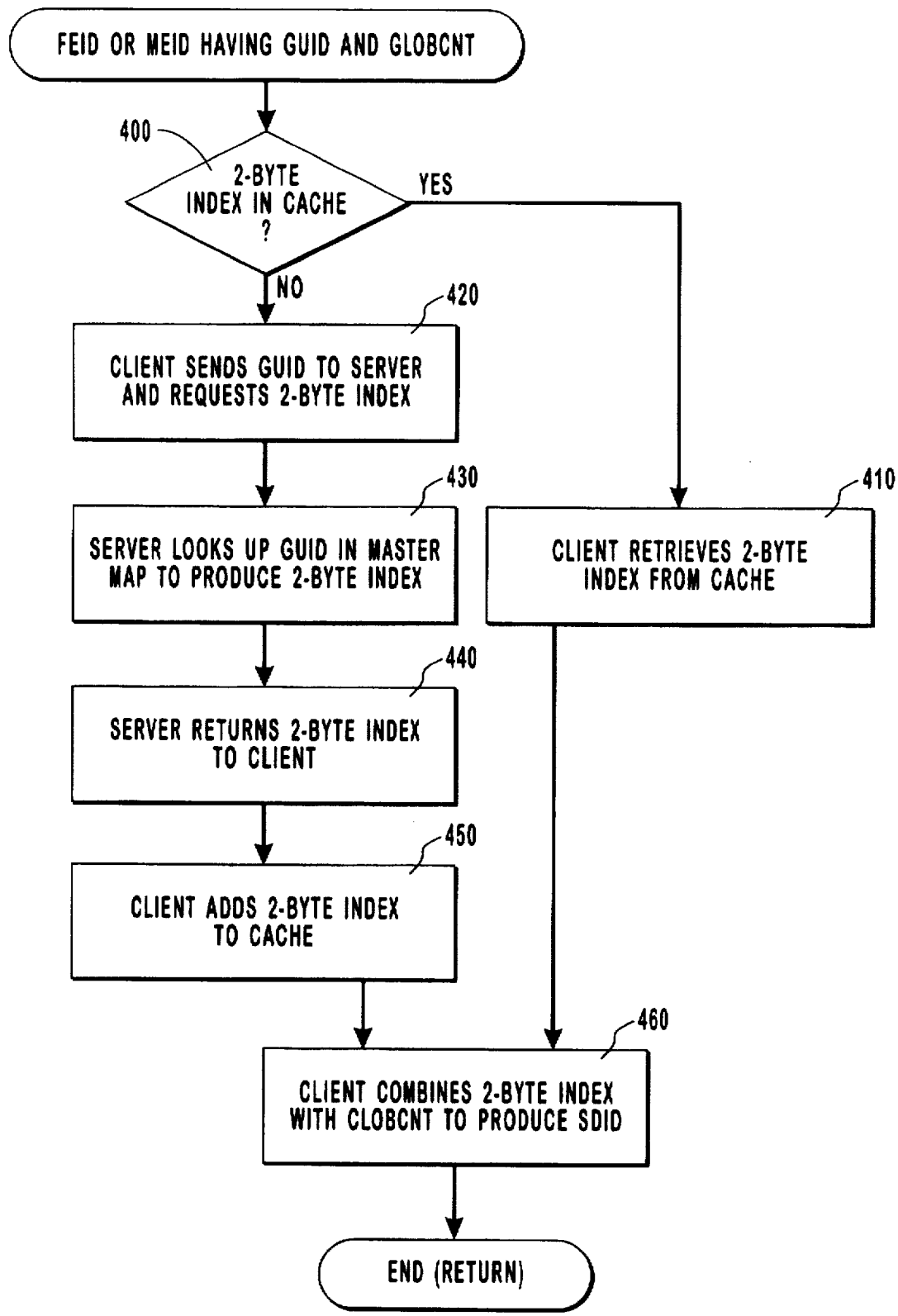
FIG. 4 is a flow chart of a procedure for converting identification codes using a local cache.

The EID format and the conversion process are now described in detail. FIGS. 2 and 3 illustrate the composition of the FEID and the MEID, respectively, and the conversion of each to SDID format. The steps of the conversion process are shown in FIG. 4. Each FEID and MEID makes use of (1) a 16-byte global unique identification code ("GUID") and (2) a global count ("GLOBCNT"), also known as a sequence number. A GUID and a GLOBCNT are included together in a unique identification code known as a record identifier. An object, e.g., a message or a folder, is given a record identifier when the object is created on a server. A GUID is a 16-byte string identifying the server. A GLOBCNT is a 6-byte integer that is different for each object created on the server.

When a server is first put into operation, the server is associated with a GUID that is changed only rarely. A server's GUID is changed when, e.g., (1) the number of objects created on the server reaches the number of possible different values of GLOBCNT ($2^{48}$, i.e., more than 281,000,000,000,000), which is extremely unlikely, or (2) the server's operation is re-started after, e.g., the server is restored from a backup copy of the server's data. A server's GUID is changed after such a restoration because it is important not to re-use a GUID/GLOBCNT combination, which is intended to identify only one object. Retaining the original GUID would create a risk of such re-use because the backup copy is usually not completely up-to-date with respect to which values of GLOBCNT have already been used with the original GUID. Therefore, changing the GUID ensures that all values of GLOBCNT are available for use with objects that are created after the restoration.

The FEID 50 is preferably a 46-byte string made up of a 22-byte prefix 52 of fixed information and a folder long-term identification code ("FLTID") 54. The prefix includes status indicators, a GUID relating to the server on which the user's mailbox is stored, and an indicator showing the type of EID, e.g., MEID or public or private FEID, in which the prefix is being used. The FLTID 54 is preferably a 24-byte string made up of a folder GUID ("FGUID") 56, a folder GLOBCNT ("FGLOBCNT") 58, and two unused bytes 60.

Similarly constructed, the MEID 40 is preferably a 70-byte string made up of (1) the FEID 50 of the folder with which the MEID's message is associated and (2) a message long term identification code ("MLTID") 68. The MLTID is preferably a 22-byte string made up of a message GUID ("MGUID") 70 and a message GLOBCNT ("MGLOBCNT") 72.

Preferably, when started, the messaging software 22 presents the user with a list or other arrangement that displays the folders and messages of the user's mailbox that are available for manipulating, e.g., for opening and reading. The messaging software has the FEIDs and MEIDs associated with these folders and messages, but does not have corresponding folder SDIDs ("FSDIDs") and message SDIDs ("MSDIDs"), which are necessary for opening these folders and messages. When, for example, the user directs the messaging software to open a folder in the mailbox, the messaging software provides the folder's FEID to the EID-SDID conversion process 25. As described below, the conversion process then uses a local cache 21 and, if necessary, a server master map 27 to determine the FSDID corresponding to the FEID and sends the FSDID to the store program. Using the FSDID, the store program is then able to open the folder. Next, with the folder open, the messaging software presents to the user a list or other arrangement displaying the messages associated with the folder. Preferably, the opened folder is able to provide the messaging software with the MEIDs of the messages displayed.

The local EID-SDID conversion process 25 operates in one of two different modes, depending on whether the conversion process is being used to reach a message or folder in (1) the mailbox or (2) the off-line store. FIG. 4 illustrates the sequence of steps used in the case of the mailbox. The sequence is the same for an FEID and an MEID, except that the sequence is performed twice for the MEID, as described below. First, in a GUID conversion 51 (FIG. 2), the messaging software determines whether the cache 21 (FIG. 1) has a 2-byte index 64 corresponding to the FEID's FGUID 56 (FIG. 4, step 400).

The cache 21 is a directory, preferably implemented in a fast-access memory, that contains a subset, accumulated as described below, of the contents of the master map 27. In the master map, a 2-byte index is assigned to each GUID encountered by the store software. Thus, the master map can include a different 2-byte index for each of up to $2^{16}$ i.e., 65,536, GUIDs. Because, as discussed above, each GUID is generally associated with a server and GUIDs change so rarely, the 2-byte index is generally sufficient to reflect every GUID encountered by the store software. A GUID-2-BYTE conversion process 29 is used by the store software for gaining access to the master map for converting between GUIDs and 2-byte indices. The master map is preferably stored at the message store and the contents of the master map do not necessarily match the contents of another master map at another server. As a result, a cache-server mismatch could produce an incorrect 2-byte index, leading to a message mis-identification. Thus, to minimize the possibility of a cache-server mismatch, the cache is preferably re-started without any contents each time the messaging software is started.

In the conversion, if the cache has a 2-byte index corresponding to the FGUID, the messaging software retrieves the 2-byte index from the cache (step 410). Otherwise, the messaging software executes the following sequence of steps to determine the 2-byte index and add the 2-byte index to the cache. First, the messaging software sends to the server's store software a conversion request that specifies the FGUID (step 420). Next, the store software invokes the GUID-2-BYTE conversion process to retrieve from the master map a 2-byte index corresponding to the FGUID (step 430). The 2-byte index is then returned to the local computer's messaging software (step 440). For future use, the messaging software adds the 2-byte index to the cache (step 450).

After the GUID conversion 51 is completed, regardless of where the 2-byte index for the FGUID was found, the messaging software then concatenates the 2-byte index and the FEID's 6-byte FGLOBCNT to produce the 8-byte FSDID 66 (step 460).

The MEID conversion (FIG. 3) is similar, except that the EID-SDID conversion 25 is executed twice for a MEID: once to produce an FSDID for the FEID portion of the MEID, and again to produce, from another 2-byte index 74, an MSDID 55 for the MLTID portion of the MEID. When the user directs the messaging software to open a message, the messaging software is thus able to obtain and then send the FSDID and the MSDID to the store software to specify precisely the message and its corresponding folder.

When the local EID-SDID conversion process 25 is used to reach a message or folder in the off-line store, the conversion process is assumed to have no access to the master map. Such an assumption is warranted, because the data link is assumed to be unavailable or inoperative. Therefore, instead of using the master map, the conversion process operates in a mode that uses maps that are created on the local computer as described below.

FIGS. 5–8 illustrate EID-NID conversion, which includes EID-SDID conversion. The off-line store 26 uses a preferred short node identification ("NID") format with which to store the messages and folders downloaded from the mailbox 12. Each downloaded message and downloaded folder in the off-line store is associated with a 4-byte message node identification code ("MNID") and a 4-byte folder node identification code ("FNID"), respectively. To allow the user to apply the same local messaging software to both the mailbox 12 and the off-line store 26, a two-stage EID-NID conversion process 28 is provided. The first stage produces an SDID from the EID and the second stage produces a NID from the SDID. With the conversion process, the messaging software can use MEIDs and FEIDs to gain access to the messages and folders in the off-line store.

Figure 5:
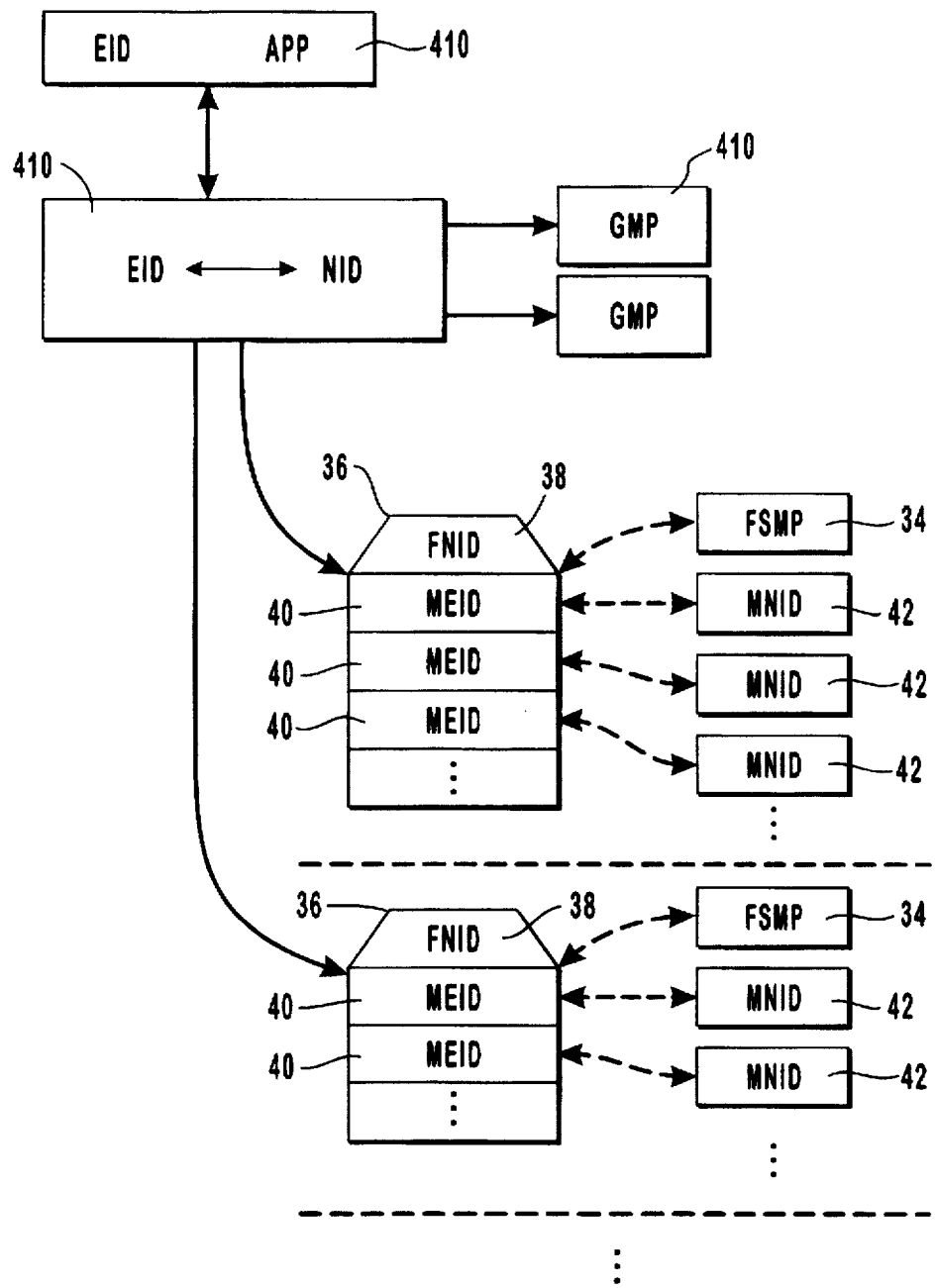
FIG. 5 is a block diagram of maps and identification codes used in a format conversion.

FIG. 5 illustrates some relationships involved with the conversion process 28. At the time that the messages and folders are downloaded, three types of maps, described in more detail below, are created or updated in the off-line store: a global unique identification code map ("GMP") 30, a global source-key map ("GSMP") 32, and a folder source-key map ("FSMP") 34. There is an FSMP for each off-line store folder. Each folder is also associated with an FNID 38 and provides a list of MEIDs 40 of off-line store messages that are associated with the folder. Each MEID 40 corresponds to a message having a MNID 42.

Preferably, when started, the messaging software 22 presents the user with a list or other arrangement that displays the off-line store folders and messages that are available for manipulating, e.g., for opening and reading. In this case, the messaging software has the FEIDs and MEIDs associated with these folders and messages, but does not have the corresponding FNIDs and MNIDs, which are necessary for opening these folders and messages. When, for example, the user directs the messaging software to open a folder in the off-line store, the messaging software provides the folder's FEID to the conversion process 28. The conversion process then uses the maps to determine the FNID corresponding to the FEID. The FNID is then used to open the folder directly to present to the user a list or other arrangement displaying the messages associated with the folder. Preferably, the opened folder is able to provide the messaging software with the MEIDs of the messages displayed.

Figure 6:
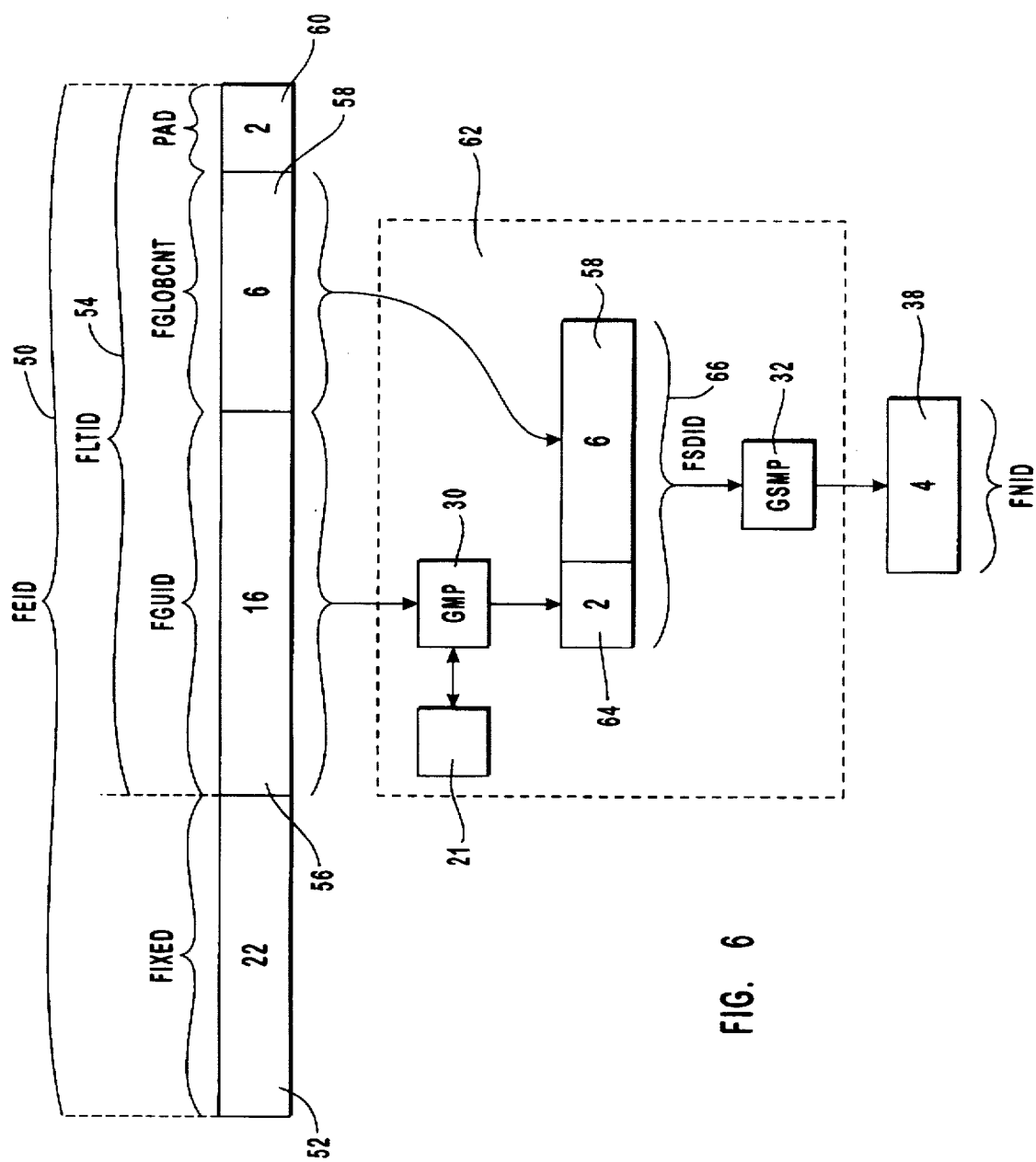
FIG. 6 is a block diagram of format conversions of a folder identification code to a short node identification code.
Figure 7:
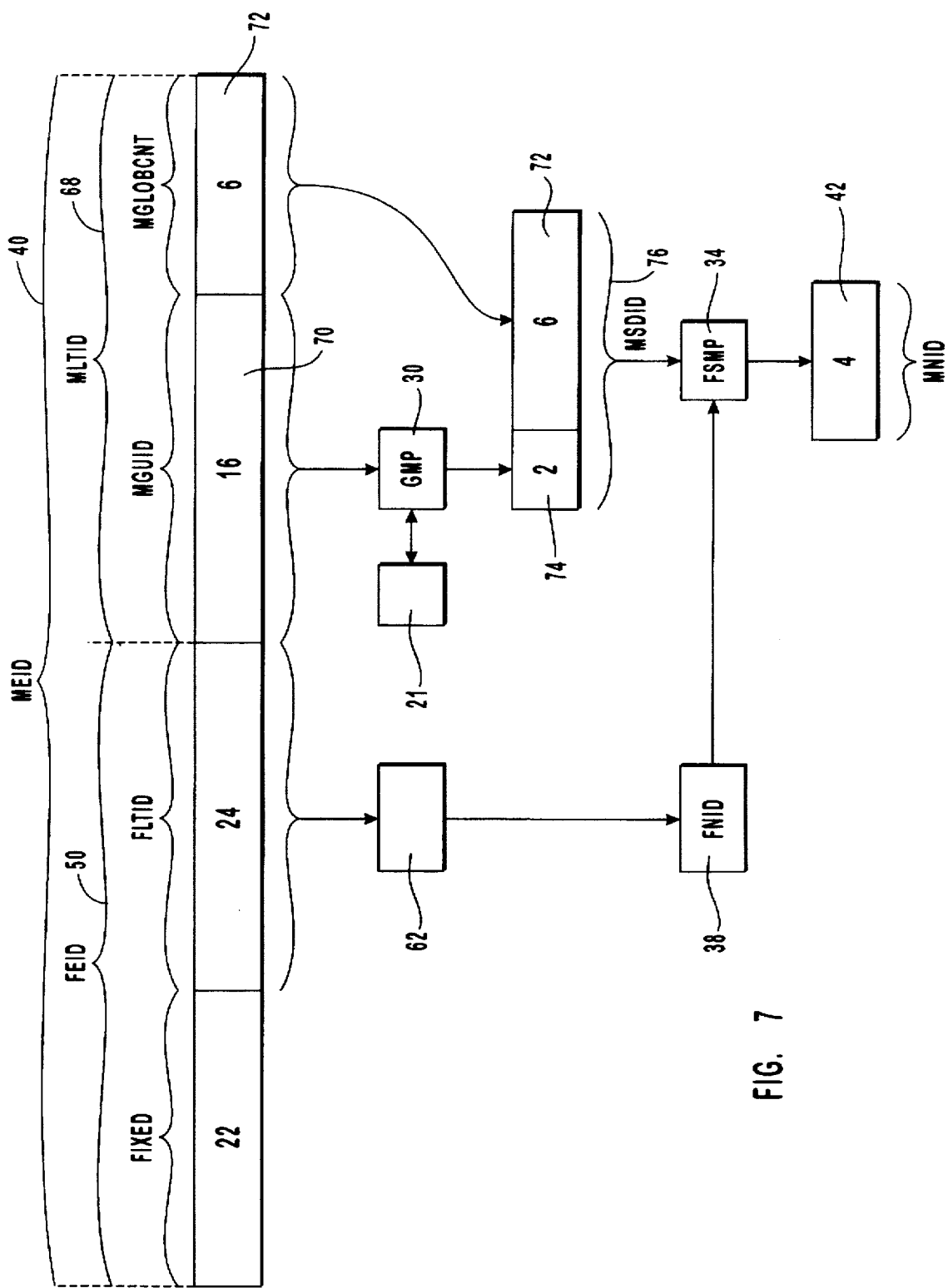
FIG. 7 is a block diagram of format conversions of a message identification to a short node identification code.
Figure 8:
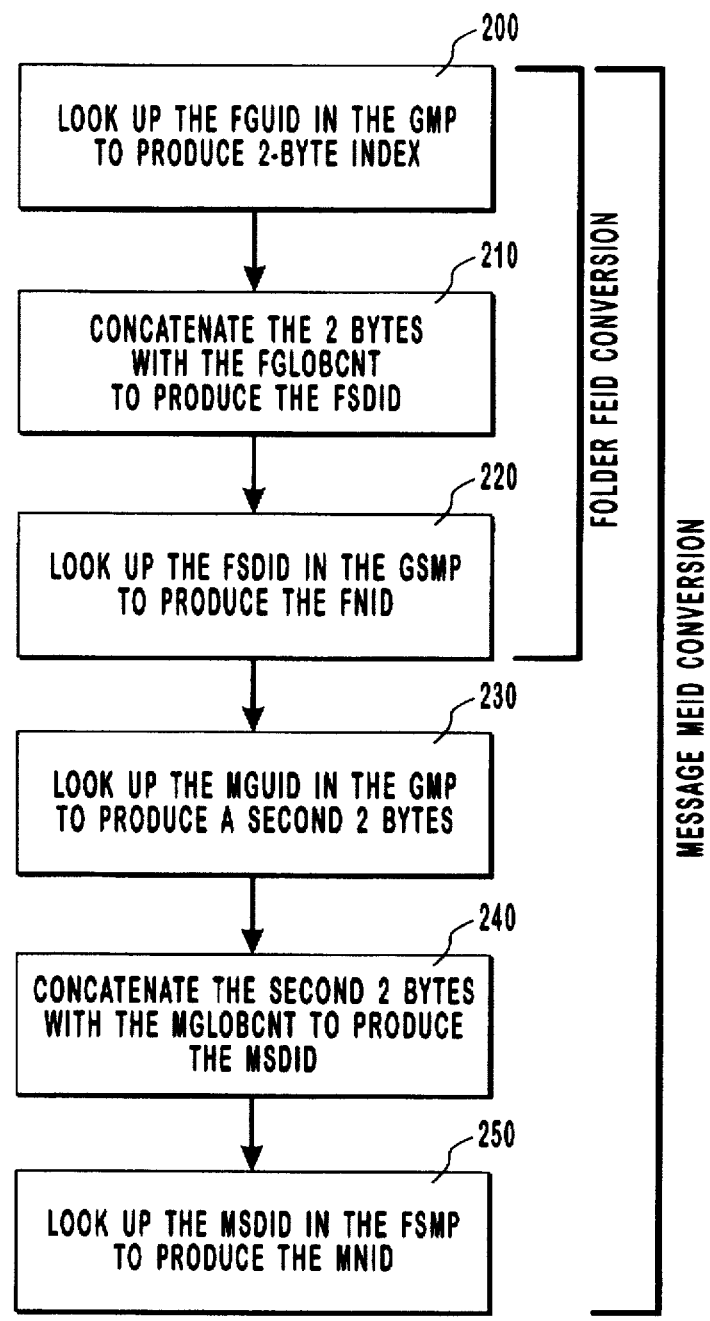
FIG. 8 is flow chart of procedures for converting identification codes when the system is offline.

With reference to FIGS. 6 and 8, the steps used in the FEID conversion 62, i.e., the conversion of the FEID 50 to an FNID 38, are now described. For every FEID involved in the off-line store, the prefix is the same, because all of the messages and folders in the off-line store are downloaded from the same server, i.e., the server storing the user's mailbox. The prefix is not used in the conversion of FEID to FNID but is stored in the off-line store for use in a reverse conversion discussed below.

First, the GMP 30 is consulted to produce a corresponding 2-byte index 64 from the FGUID 56 (step 200). Using the contents of the master map 27 described above, the GMP is preferably created in the form of a B-tree map when the off-line store is initially created. For example, the GMP is created when the messaging software is initially installed on the local computer. Thereafter, whenever the user directs the system to download a selection of folders, messages, or both from the mailbox to the off-line store, the GMP is also updated. The GMP preferably stores the encountered GUIDs in a stream of data such that the offset position of a GUID in the stream can be computed from the GUID's 2-byte index. This is useful for reverse conversion, e.g., converting from FNID to FEID, which is discussed in more detail below. In addition, to enhance the speed of the conversion from GUID to 2-byte index, the GMP preferably uses the cache 21, described above. The cache includes 2-byte indices for a subset of the GUIDs in the GMP, preferably the GUIDs most recently encountered. Thus, for the GUIDs in the subset, the cache allows the GMP's B-tree to be bypassed.

In the conversion from FEID to FNID, after the 2-byte index 64 is produced, an FSDID 66 is created by concatenating the 2-byte index with the FGLOBCNT 58 (step 210). The GSMP 32 is then consulted to produce the FNID 38 from the FSDID (step 220). The FNID is then used for opening the folder for which the messaging software had only the FEID.

Like the GMP, the GSMP is preferably created in the form of a B-tree map when the off-line store is initially created and is updated whenever the user directs the system to download a selection of folders, messages, or both. Unlike the GMP, however, the GSMP is preferably not involved in a reverse conversion, as discussed in detail below.

Now discussed are the MEID 40 and the MEID conversion, i.e., the conversion from an MEID to an MNID 42. MEID conversion becomes necessary when, e.g., a folder has been opened to display the messages associated with the folder and the user has directed the messaging software to open one of the messages.

The first three steps involved in the MEID conversion are identical to the three steps (200, 210, 220) of the FEID conversion 62, because the FNID 38 corresponding to the FEID 50 portion of the MEID is needed. This FNID 38 is needed because this FNID points to an FSMP 34 used in a subsequent step in the MEID conversion. The FSMP 34 is similar to the GSMP 32 in that the FSMP is also implemented as a B-tree. However, the FSMP is different from the GSMP in that the FSMP is (1) created when its associated folder is downloaded, not when the off-line store is created; (2) updated when a previously unencountered message associated with the FSMP's folder is downloaded; and (3) consulted to produce an MNID, not an FNID.

The FSMP 34 used in the MEID conversion corresponds to the folder with which the MEID's message is associated. Therefore, the FEID portion of the MEID is converted to an FNID to point to the FSMP. This FNID was derived from the same FEID when the message's folder was opened to allow the user to select the message for opening. However, for simplicity, this FNID is derived again here so that the conversion process is not required to keep track of the FNID derived during the opening of the folder.

After the FEID portion of the MEID is converted, the MLTID portion of the MEID is converted to an MNID in much the same way, discussed above, that an FLTID is converted to an FNID. The GMP 30 is consulted to produce a corresponding 2-byte index 74 from the MGUID 70 (step 230). The MEID's FGUID and MGUID are expected to be identical and are therefore expected to lead to identical 2-byte indices. However, again for simplicity, a 2-byte index is derived here from the MGUID as well so that the conversion process is not required to keep track of the 2-byte index derived previously from the FGUID.

Next, the 2-byte index 74 is concatenated with the MGLOBCNT 72 to produce the MSDID 76 (step 240). Finally, the FSMP 34 to which the FNID 38 points is consulted to produce the MNID 42 from the MSDID (step 250). The MNID is then used for opening the message for which the messaging software had only the MEID.

Reverse conversion, i.e., from NID or SDID format to EID format, is necessary when, for example, the user has opened a folder and directs the messaging software to create a link, in an outgoing message, to the opened folder. Such a link is created by including the folder's FEID in the outgoing message. Because the folder is already open, the messaging software does not have the folder's associated FEID. Therefore, the folder's FEID must be generated. A similar need arises when the user directs the messaging software to imbed an opened message in another message.

When the messaging software has access to the store software across the data link, the conversion from SDID format back to EID format is initiated by sending a conversion request to the store software. The request specifies the 2-byte index from the SDID. Using the GUID-2-BYTE conversion process, the store software produces, from the 2-byte index, a GUID that is returned to the messaging software for use in constructing either an MEID or an FEID, as necessary.

In the case of the off-line store, the reverse conversion uses the GMP but has no need for the GSMP or an FSMP.

because the off-line store retains the FSDID and MSDID for each folder and message, respectively. Therefore, a reverse conversion starts with an FSDID or an MSDID to which an FNID or MNID points. As discussed above, an FSDID is made up of a 2-byte index and an FGLOBCNT. Similarly, an MSDID is made up of another 2-byte index and an MGLOBCNT. Thus, a folder's FEID is constructed by concatenating (1) the stored 22-byte prefix, (2) an FGUID retrieved from the GMP's data stream using the 2-byte index, (3) the FGLOBCNT, and (4) two unused bytes. Similarly, a message's MEID is constructed by concatenating (1) the message's folder's FEID, constructed as just described, (2) an MGUID retrieved from the GMP's data stream using the other 2-byte index, and (3) the MGLOBCNT.

Other embodiments are within the scope of the following claims. For example, when the data link is available and operative, a version of the GMP may be used to minimize the quantity of the messaging software's requests for 2-byte indices.

What is claimed is:

1. In an electronic mail system comprising a local computer that can be connected to a message server over a data link either to access messages that are collected into folders on the message server, or to copy messages and folders to the local computer for access offline, and wherein each message and each folder has an identifier that is globally unique throughout the electronic mail system but where each message and each folder is stored on the local computer and server with identifiers shorter in length than the globally unique identifiers, a method of converting a globally unique identifier comprising a first part and a second part to a smaller identifier that is used to access a message or folder, the method comprising the steps of:

determining whether to access a local conversion man or a master conversion map accessible via the data link; and depending on the outcome of the determination, selecting said local map or said master conversion map to serve as a conversion map;

using said conversion map to produce an index from the first part, the index being smaller than the first part; and combining the index with the second part to produce the smaller identifier.

2. The method of claim 1, wherein the method further comprises using a second conversion map to produce a third identifier that can be used to access folders or messages from the smaller identifier.

3. The method of claim 2, wherein the third identifier is used to access a message or folder stored in a message store located at the local computer.

4. The method of claim 3, wherein the global identifier is associated with a message store located at the server.

5. The method of claim 2, wherein the third message identifier is used to access a message or folder stored in a message store located at the server.

6. The method of claim 2, wherein the method comprises using said conversion map to convert a folder identifier that can be used to access a folder.

7. The method of claim 2, wherein the method further comprises storing the smaller identifier so that the global identifier can subsequently be derived from the smaller identifier in a reverse conversion using the conversion map.

8. The method of claim 2, wherein at least one of the conversion maps comprise a B-tree.

9. The method of claim 2, wherein at least one of the conversion maps utilize a cache.

10. The method of claim 1, wherein
the local conversion map comprises a subset of the contents of the master conversion map; and
the master conversion map comprises a full set of mapping information for producing the index from the first part.

11. The method of claim 10, wherein the method further comprises accumulating the subset by retaining mapping information obtained during a previous instance of a conversion using the master conversion map.

12. The method of claim 11, wherein the method further comprises using the master conversion map if the index cannot be produced initially using the local conversion map.

13. The method of claim 11, wherein the method further comprises starting with an empty local conversion map when messaging software is started.

14. The method of claim 11, wherein a message at a message store accessible via the data link is stored using the smaller identifier.

15. The method of claim 11, wherein the method comprises using the conversion map to convert a folder identifier.

16. The method of claim 1, wherein the conversion produces an identifier used to access a folder or message stored in an off-line message store.

17. The method of claim 1, wherein the conversion produces an identifier used to access a folder or a message stored in a message store accessible via the data link.

18. In an electronic mail system comprising a local computer that can be connected to a message server over a data link either to access messages that are collected into folders on the message server, or to copy messages and folders to the local computer for access offline, and wherein each message and each folder has an identifier that is globally unique throughout the mail system but where each message and folder are stored on the local computer and server with identifiers shorter in length than the globally unique identifiers, as an article of manufacture, a computer program product for converting a globally unique identifier to a second smaller identifier that is used to access a message or folder, said computer program product comprising:

computer-readable storage medium having computer executable instructions encoded thereon comprising:
means for determining whether to access a local conversion map or a master conversion map, accessible via the data link;
means for selecting said local map or said master conversion map to server as a conversion map depending on the outcome;
means for using said conversion map to produce an index from the first part, the index being smaller than the first part; and
means for combining the index with the second part to produce the smaller identifier.

19. The computer program product of claim 18, wherein the instructions further comprise means for causing the system to use a second conversion map to produce a third identifier that can be used to access folders or messages from the smaller identifier.

20. The computer program product of claim 19, wherein the third message identifier is used to access a message or folder stored in a message store located at the local computer.

21. The computer program product of claim 20, wherein the global identifier is associated with a message store located at the server.

22. The computer program product of claim 19, wherein the third message identifier is used to access a message or folder stored in a message store located at the server.

23. The computer program product of claim 19, wherein the instructions further comprise means for causing the system to use the conversion map to convert a folder identifier that can be used to access a folder.

24. The computer program product of claim 19, wherein the instructions further comprise means for causing the system to store the smaller identifier so that the global identifier can subsequently be derived from the smaller identifier in a reverse conversion using the conversion map.

25. The computer program product of claim 19, wherein at least one of the conversion maps comprise a B-tree.

26. The computer program product of claim 19, wherein at least one of the conversion maps utilize a cache.

27. The computer program product of claim 18, wherein the local conversion map comprises a subset of the contents of the master conversion map; and the master conversion map comprises a full set of mapping information for producing the index from the first part.

28. The computer program product or claim 27, wherein the instructions further comprise means for causing the system to accumulate the subset by retaining mapping information obtained during a previous instance of a conversion using the master conversion map.

29. The computer program product of claim 28, wherein the instructions further comprise means for causing the system to use the master conversion map if the index cannot be produced initially using the local conversion map.

30. The computer program product of claim 28, wherein the instructions further comprise means for causing the system to start with an empty local conversion map when messaging software is started.

31. The computer program product of claim 28, wherein a message at a message store accessible via the data link is stored using the smaller identifier.

32. The computer program product of claim 28, wherein the instructions comprise means for causing the system to use the conversion map to convert a folder identifier.

33. The computer program product of claim 18, wherein the conversion produces an identifier used to access a folder or message stored in an off-line message store.

34. The computer program product of claim 18, wherein the conversion produces an identifier used to access a folder or message stored in a message store accessible via the data link.

* * * * *

UNITED STATES PATENT AND TRADEMARK OFFICE
CERTIFICATE OF CORRECTION

PATENT NO. : 5,793,970

DATED : Aug. 11, 1998

INVENTOR(S) : Fakes et al.

It is certified that error appears in the above-identified patent and that said Letters Patent is hereby corrected as shown below:

Col. 9, line 34, after "conversion" change "man" to --map--

Col. 10, line 43, before "accessible" delete the comma

Signed and Sealed this

Twenty-first Day of December, 1999

Attest:

Q. TODD DICKINSON

Attesting Officer

Acting Commissioner of Patents and Trademarks